United States Patent
Sacheau et al.

(10) Patent No.: US 10,249,097 B2
(45) Date of Patent: Apr. 2, 2019

(54) METHOD OF GRAPHICAL MANAGEMENT OF THE SYMBOLOGY IN A THREE-DIMENSIONAL SYNTHETIC VIEW OF THE EXTERIOR LANDSCAPE IN AN ON-BOARD VIEWING SYSTEM FOR AN AIRCRAFT

(71) Applicant: THALES, Courbevoie (FR)

(72) Inventors: Romain Sacheau, Merignac (FR);
Didier Poisson, Toulouse (FR);
Emmanuel Monvoisin, Bordeaux (FR);
Frédéric Scarfone, Pessac (FR);
Patrice Malot, Arcachon (FR)

(73) Assignee: THALES, Courbevoie (FR)

( * ) Notice: Subject to any disclaimer, the term of this patent is extended or adjusted under 35 U.S.C. 154(b) by 11 days.

(21) Appl. No.: 15/640,933

(22) Filed: Jul. 3, 2017

(65) Prior Publication Data
US 2018/0033207 A1 Feb. 1, 2018

(30) Foreign Application Priority Data
Jul. 28, 2016 (FR) ...................................... 16 01161

(51) Int. Cl.
*G06T 19/00* (2011.01)
*B64D 43/00* (2006.01)
(Continued)

(52) U.S. Cl.
CPC ............ *G06T 19/006* (2013.01); *B64D 43/00* (2013.01); *G01C 23/005* (2013.01); *G06F 3/147* (2013.01);
(Continued)

(58) Field of Classification Search
CPC ........ B64D 43/00; B64D 43/02; B64D 45/00; G01C 23/00; G01C 23/005; G05D 1/101;
(Continued)

(56) References Cited

U.S. PATENT DOCUMENTS

2007/0080828 A1* 4/2007 He ........................ G01C 23/005
340/974
2007/0085705 A1* 4/2007 He ......................... G01C 23/00
340/967

(Continued)

FOREIGN PATENT DOCUMENTS

GB           792102       * 3/1958

OTHER PUBLICATIONS

Rockwell Collins: Head-Up Guidance System, "HGS Pilot Guide for the Bombarider CRJ 700," Nov. 1, 2002, XP055365503.

*Primary Examiner* — Diane M Wills
(74) *Attorney, Agent, or Firm* — Baker & Hostetler LLP

(57) ABSTRACT

A method for managing a symbology in an on-board viewing system for an aircraft, the graphical representation comprising the piloting and navigation symbology overlaid on a representation of the exterior landscape, the symbology comprises a first angular attitude scale comprising a first symbol called an aircraft mockup, a second speed scale, a third altitude scale and a second symbol called the speed vector. When the angular lateral distance between the position of the first symbol and the position of the second symbol is such that the second symbol is not overlaid on the lateral scales, the various scales are represented in the nominal position; when the angular lateral distance between the position of the first symbol and the position of the second symbol is such that the second symbol is overlaid on one of the scales, the various scales move and/or their size decreases.

11 Claims, 4 Drawing Sheets

(51) Int. Cl.
*G01C 23/00* (2006.01)
*G06T 19/20* (2011.01)
*G06F 3/147* (2006.01)

(52) U.S. Cl.
CPC ............ *G06T 19/003* (2013.01); *G06T 19/20* (2013.01); *G06T 2219/2004* (2013.01); *G06T 2219/2016* (2013.01); *G09G 2340/14* (2013.01); *G09G 2354/00* (2013.01); *G09G 2380/12* (2013.01)

(58) Field of Classification Search
CPC ...... G05D 1/08; G05D 1/0808; G06T 19/003; G06T 2219/2004; G06T 2219/2016; G08G 5/02; G09G 2380/12
See application file for complete search history.

(56) References Cited

U.S. PATENT DOCUMENTS

| | | | |
|---|---|---|---|
| 2009/0207048 A1* | 8/2009 | He | G01C 23/00 340/973 |
| 2013/0304283 A1 | 11/2013 | Puyou et al. | |
| 2016/0340054 A1* | 11/2016 | Andre | B64D 43/00 |

* cited by examiner

METHOD OF GRAPHICAL MANAGEMENT OF THE SYMBOLOGY IN A THREE-DIMENSIONAL SYNTHETIC VIEW OF THE EXTERIOR LANDSCAPE IN AN ON-BOARD VIEWING SYSTEM FOR AN AIRCRAFT

CROSS-REFERENCE TO RELATED APPLICATIONS

This application claims priority to foreign French patent application No. FR 1601161, filed on Jul. 28, 2016, the disclosure of which is incorporated by reference in its entirety.

FIELD OF THE INVENTION

The field of the invention is that of man-system interfaces for aeronautical applications, and more particularly that of synthetic viewing systems comprising means for displaying a three-dimensional synthetic image of the exterior landscape.

BACKGROUND

Modern aircraft generally possess a synthetic vision system called "SVS". This system allows a synthetic image of the exterior landscape, generally comprising piloting or navigation information, to be presented to the crew.

An SVS system comprises a cartographic database representative of the terrain overflown, a geolocation system, an inertial platform, sensors measuring altitude and speed, electronic calculation means and one or more viewing devices installed in the cockpit of the aircraft. The geolocation system is of the "GPS" type, the acronym standing for "Global Positioning System". Generally, the synthetic image is displayed on the viewing screens which are situated on the front face of the aircraft's instrument panel.

The synthetic image is a three-dimensional view of the exterior represented in the most realistic possible manner. The viewpoint displayed is generally on the axis of the craft. This image comprises a symbology intended to aid piloting and navigation. By way of example, FIG. 1 represents in a stylized manner and with the constraints inherent in patent figures, an image of this type. It comprises a view of the exterior landscape as background and a symbology represented in black lines. The latter comprises essentially:

The so-called "ADI" parameters, the acronym standing for "Attitude Director Indicator" which give the attitude of the craft, that is to say its angular position in terms of roll and pitch. Conventionally, the position of the craft is represented by a symbol 1 called an aircraft mockup centred on a scale 2 graduated in degrees. In FIG. 1, the scale 2 is represented by two series, spaced apart by 5 degrees, of symmetric symbols 3. It also comprises a horizon bar 4;

The air speed scale 5. This is a vertical scale situated on the left of the attitude scale. It represents the speed of the craft and is generally graduated in knots. In FIG. 1, the air speed is about 155 knots;

The altitude scale 6. This is a vertical scale situated on the right of the attitude scale. It is generally graduated in feet. In FIG. 1, the altitude of the craft is 1000 feet. This scale 6 is symmetric with the speed scale 5 with respect to the ADI scale 2;

The speed vector 7. This is generally represented by a circle comprising two symmetric horizontal segments and a vertical segment. It represents the angular direction that the speed of the craft makes with the angular position of the craft.

When the flight conditions are nominal, the speed vector is close to the aircraft mockup and the representation of the symbology does not pose any particular problems. However, when there is a strong crosswind, the speed vector is shifted and if it is represented in a conformal manner, it will cross the speed or altitude scales before exiting the field of the image. To avoid this first problem, onwards of a certain shift, the speed vector is no longer represented in a conformal manner but dashed so as to signify to the pilot that his position is no longer conformal. This change of appearance of the speed vector is illustrated in FIG. 2.

A second problem arises. If the aircraft is in the landing phase, the speed vector is representative of the direction followed by the craft in order to reach the landing runway. Consequently, the representation of the image of the runway itself is shifted, is no longer centred and becomes overlaid on the speed or altitude scales. Thus, the image of the runway loses in terms of visibility. In FIG. 2, the runway 10 is represented by two white lines.

SUMMARY OF THE INVENTION

The method of graphical management of the symbology in a three-dimensional synthetic view of the exterior landscape in an on-board viewing system for an aircraft according to the invention does not exhibit the previous drawbacks. It consists in modifying the location or the amplitude of the various scales so as to display the speed vector in the field of the image. More precisely, the subject of the invention is a method of graphical management of a symbology in a three-dimensional synthetic view of the exterior landscape displayed in an on-board viewing system for an aircraft, the said viewing system comprising a graphical calculator ensuring the graphical management of the symbols and a viewing screen, the graphical representation displayed on the said viewing screen and comprising the symbology representative of the information items for piloting and for navigating the said aircraft which are overlaid on a three-dimensional synthetic representation of the exterior landscape, the said symbology essentially comprising a first angular attitude scale comprising a first symbol called an aircraft mockup represented in conformal position, a second vertical speed scale, a third vertical altitude scale, a second symbol called the speed vector represented in conformal position, characterized in that:

when the angular lateral distance between the position of the first symbol and the position of the second symbol is such that the second symbol is overlaid neither on the second scale nor on the third scale, the first scale is centred on the viewing screen, the second scale and the third scale being disposed on either side of the first scale in a symmetric manner, the second scale having a first determined height and the third scale having a second determined height;

when the angular lateral distance between the position of the first symbol and the position of the second symbol is such that the second symbol is overlaid either on the second scale or on the third scale, the value of the first height of the second scale decreases and/or the value of the second height of the third scale decreases and/or the lateral position of the first scale is shifted in such a way that the second symbol called the speed vector is represented in conformal position without overlay.

Advantageously, when the first height of the second scale or the second height of the third scale have been decreased, the second scale or the third scale are displaced vertically so as not to interfere with the second symbol.

Advantageously, when the angular longitudinal distance between the position of the first symbol and the position of the second symbol is greater than a predetermined angular value, the three scales are shifted longitudinally by the same value.

Advantageously, when the angular lateral distance between the position of the first symbol and the position of the second symbol is such that the second symbol is overlaid neither on the second scale nor on the third scale, the distances separating the second scale and the third scale from the first scale are reduced as a function of the three-dimensional synthetic representation of the exterior landscape, the second symbol called the speed vector being represented in conformal position without overlay.

Advantageously, the modifications of height and/or of location of the first scale, of the second scale or of the third scale are performed automatically by the graphical calculator as a function of predetermined settings.

Advantageously, the shifting of the lateral position of the first scale begins only when the angular lateral distance between the position of the first symbol and the position of the second symbol is greater than or equal to 7 degrees.

Advantageously, the shifting is interrupted when the angular lateral distance between the position of the first scale and the position of the second or of the third scale is equal to 1 degree.

Advantageously, the fluctuations of the angular lateral distance between the position of the first symbol and the position of the second symbol are taken into account in real time by the graphical calculator after having applied a temporal filtering.

Advantageously, when the first scale has undergone a displacement equal to an authorized maximum displacement, the speed vector occupying a so-called maximum position, the first scale begins to return towards the centre and the heights of the second scale and of the third scale change only if the speed vector moves by more than one degree with respect to this so-called maximum position.

Advantageously, the modifications of height and/or of location of the first scale, of the second scale or of the third scale are performed manually by means of a man-machine interface of the viewing system.

Advantageously, when the attitude of the aircraft in terms of roll or pitch becomes greater than a determined value or when all other critical information items require the display of the second and third scales in their first determined heights, the first scale is centred on the viewing screen, the second scale and the third scale are disposed on either side of the first scale in a symmetric manner, the second scale having a first determined height and the third scale having a second determined height.

BRIEF DESCRIPTION OF THE DRAWINGS

The invention will be better understood and other advantages will become apparent on reading the nonlimiting description which follows and by virtue of the appended figures among which.

DETAILED DESCRIPTION

Figure 1:
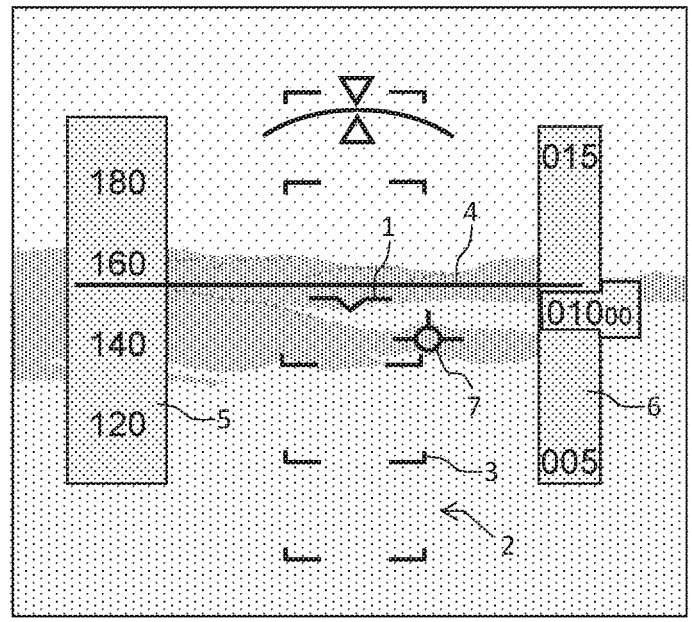
FIG. 1 represents a first view of an exterior landscape as background and of a symbology according to the prior art.
Figure 2:
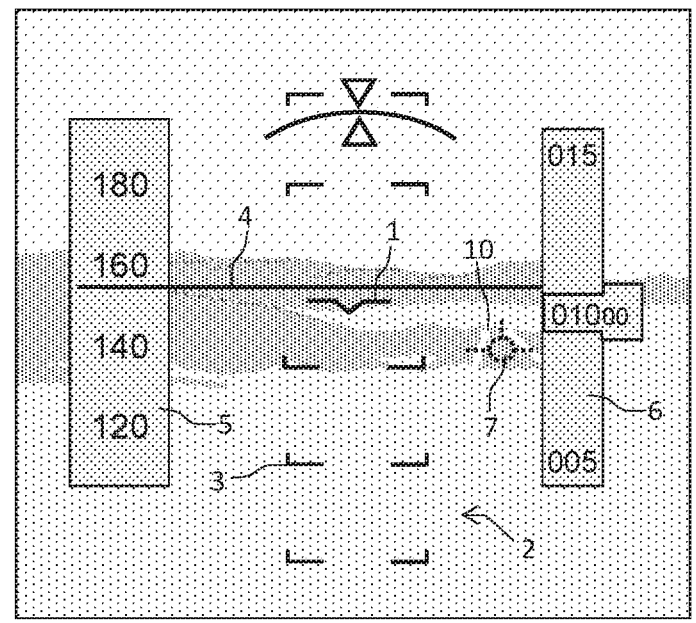
FIG. 2 represents a second view of an exterior landscape as background and of a symbology according to the prior art.

The method according to the invention is implemented in an SVS system. The latter comprises a cartographic database representative of the terrain overflown, a geolocation system, an inertial platform, sensors measuring altitude and speed, electronic calculation means and one or more viewing devices installed in the cockpit of the aircraft. The geolocation system is of the "GPS" type, the acronym standing for "Global Positioning System". Generally, the synthetic image is displayed on the viewing screens which are situated on the front face of the aircraft's instrument panel.

The synthetic image is a three-dimensional view of the exterior represented in the most realistic possible manner. The viewpoint displayed is generally on the axis of the craft. This image comprises a symbology intended to aid piloting and navigation.

This symbology essentially comprises a first angular attitude scale 2 comprising a first symbol 1 called an aircraft mockup represented in conformal position, a second vertical speed scale 5, a third vertical altitude scale 6 and a second symbol called the speed vector 7 represented in conformal position.

The method according to the invention relates to the graphical management of these various symbols in such a way that all of these information items are clearly visible and identifiable by the pilot. This method requires adaptations of the graphical software for managing these various symbols. These adaptations which consist essentially in translations or variations of dimensions of scale as a function of simple parameters do not require any significant calculational or memory resources and do not present any particular difficulties of setup for the person skilled in the art.

The subject of the method consists in modifying the location or the amplitude of the various scales so as to display the speed vector in the field of the image, including when the angular lateral distance between the position of the aircraft mockup and the position of the speed vector is significant. Moreover, it makes it possible for significant objects of the exterior landscape, such as landing runways, to always remain visible.

In a first step of the method, the angular lateral distance between the position of the aircraft mockup and the position of the speed vector is calculated.

When the angular lateral distance between the position of these two symbols is such that the speed vector is overlaid neither on the second speed scale nor on the third altitude scale, the symbology is arranged in a conventional manner such as represented in FIG. 1. The first attitude scale is centred on the viewing screen and the second speed scale and the third altitude scale are disposed on either side of the first scale in a symmetric manner, the second scale having a first determined height and the third scale having a second determined height.

When the angular lateral distance between the position of the aircraft mockup and the position of the speed vector is such that the speed vector is overlaid either on the second speed scale or on the third altitude scale, the value of the first height of the second scale decreases and/or the value of the second height of the third scale decreases and/or the lateral position of the first scale is shifted in such a way that the second symbol called the speed vector is represented in conformal position without overlay. This large angular distance may be due, for example, to a strong crosswind.

This case is illustrated in FIGS. 3 to 6. In these various figures and in FIG. 7, the displacements of scale are represented by white arrows and the reductions of scale by triplets of white chevrons. The previous references of the symbols have been retained.

Figure 3:
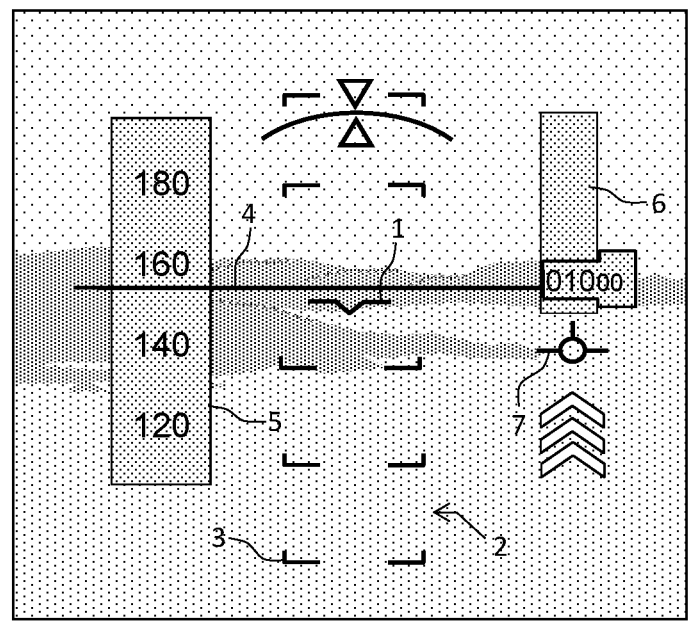
FIGS. 3 to 7 represent several variants of implementation of the method of graphical management of a symbology of ADI type according to the invention.

In FIG. 3, the speed vector 7 is shifted towards the right and is situated at the level of the altitude scale 6. The latter is reduced in height so as to avoid the overlaying of the two symbols. The altitude information item is retained. The other symbols are not touched and remain in their original place.

Figure 4:
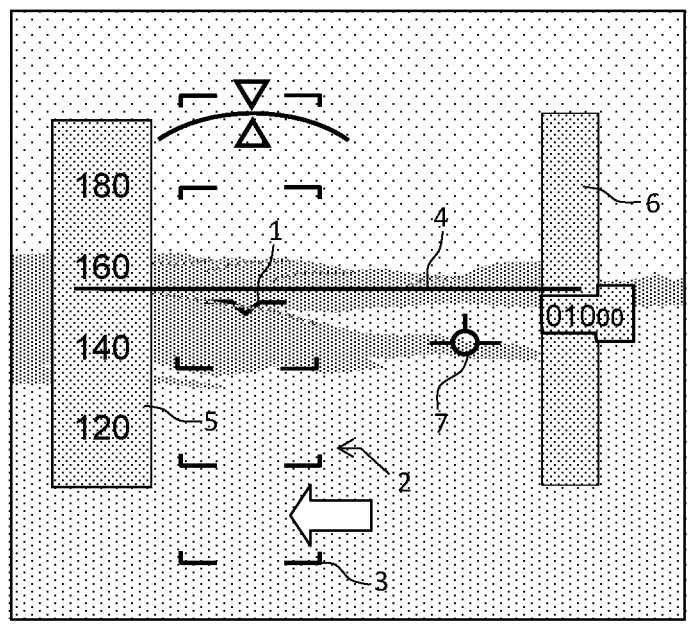

Alternatively, in order to avoid the reduction in size of the lateral scales, it is possible to shift the attitude scale. FIG. 4 illustrates this case. The attitude scale 2 is shifted towards the left dragging the aircraft mockup 1 with it in such a way that the symbol of the speed vector 7 does not coincide with the altitude scale 6.

Figure 5:
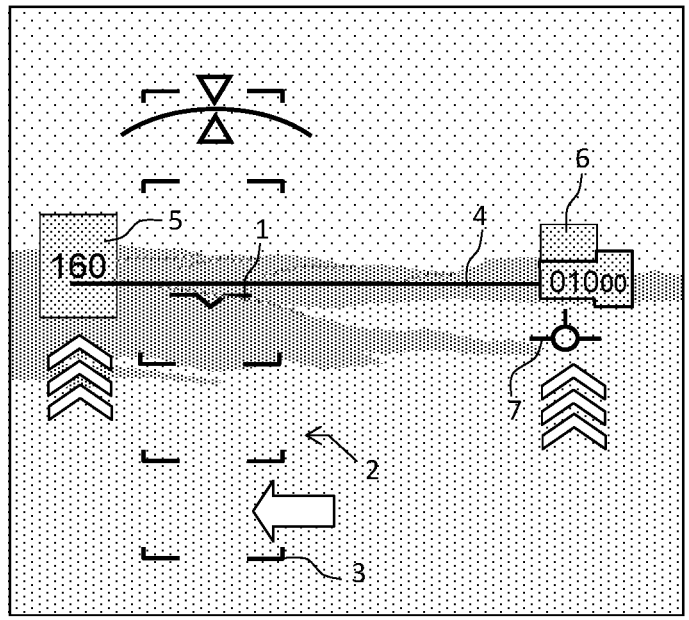

In very strong crosswind, it is possible to combine the previous two solutions. FIG. 5 illustrates this case. The speed scale 5 and altitude scale 6 are reduced in height and the attitude scale 2 is shifted towards the left dragging the aircraft mockup 1 with it. The altitude and speed information items are, of course, retained. The speed vector 7 is very visible.

Figure 6:
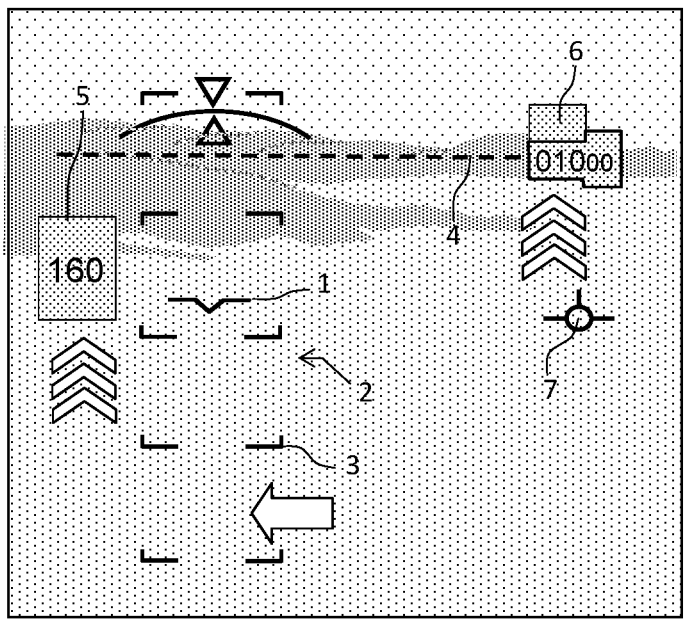

In the case of FIG. 5, it is possible that, despite the size reductions of the scales, the speed vector 7 may still be overlaid either on the speed scale 5, or on the altitude scale 6. In this case, the scale concerned is reduced and displaced as seen in FIG. 6. In this figure, the symbol 7 representing the speed vector remains very visible.

When the angular longitudinal distance between the position of the first symbol and the position of the second symbol is greater than a predetermined angular value, the three scales can be shifted longitudinally by the same value in such a way that the two symbols remain in the display field.

Figure 7:
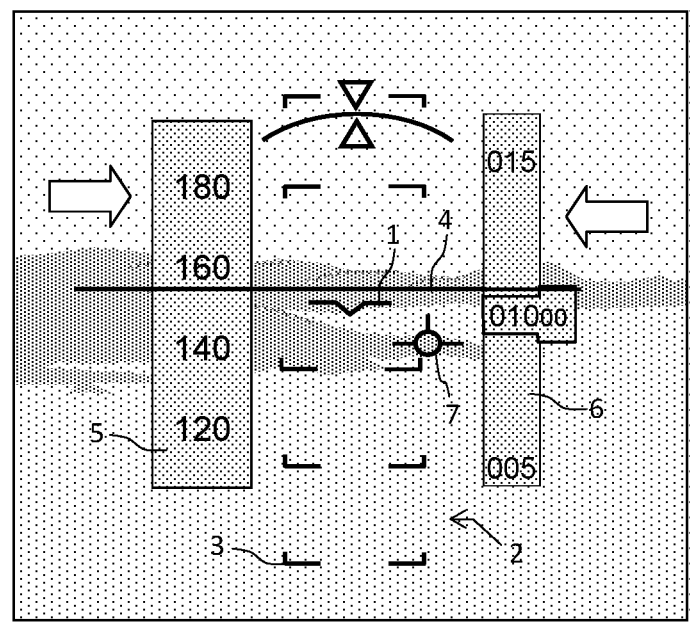

When the angular lateral distance between the position of the first symbol and the position of the second symbol is such that the second symbol is overlaid neither on the second scale nor on the third scale, the distances separating the second scale and the third scale from the first scale are reduced as a function of the three-dimensional synthetic representation of the exterior landscape, the second symbol called the speed vector being represented in conformal position without overlay. This step of the method is illustrated in FIG. 7 where the lateral scales 5 and 6 are brought closer together to allow the pilot to have all the base parameters grouped in a reduced zone and thus to reduce the visual travel required in order to read them.

All the modifications of height and/or of location of the first scale, of the second scale or of the third scale can be performed automatically by the graphical calculator as a function of predetermined settings. These settings are calculated in such a way that the aircraft mockup and the speed vector always remain very visible. These settings are expressed either in degrees or as a function of the parameters of the viewing screen.

By way of first example, the shifting of the lateral position of the first scale can only begin when the angular lateral distance between the position of the first symbol and the position of the second symbol is greater than or equal to 7 degrees. By way of second example, the shifting may be interrupted when the angular lateral distance between the position of the first scale and the position of the second or of the third scale is equal to 1 degree.

To avoid untimely fluctuations of the various scales, when, for example, the wind varies through gusts, the fluctuations of the angular lateral distance between the position of the first symbol and the position of the second symbol may only be taken into account when they exceed 1 degree in a given time interval. Generally, the movements of the scales are filtered.

Alternatively, the modifications of height and/or of location of the first scale, of the second scale or of the third scale are performed manually or semi-manually if the user wishes to adjust only a particular scale. These manual adjustments are made by means of a man-machine interface of the viewing system. The interface can be a device of computer "mouse" type, a touchscreen or else a voice control. Thus, the user adjusts the symbology entirely or in part as he so desires.

Finally, when the attitude of the aircraft in terms of roll or pitch becomes greater than a determined value, the method according to the invention restores the normal mode. The first attitude scale is centred on the viewing screen and the second speed scale and the third altitude scale are disposed on either side of the first scale in a symmetric manner, the second scale having a first determined height and the third scale having a second determined height.

The invention claimed is:

1. A method of graphical management of a symbology in a three-dimensional synthetic view of the exterior landscape displayed in an on-board viewing system for an aircraft, the viewing system comprising a graphical calculator ensuring the graphical management of the symbols and a viewing screen, the graphical representation displayed only on the viewing screen and comprising the symbology representative of the information items for piloting and for navigating the aircraft which are overlaid on a three-dimensional synthetic representation of the exterior landscape, the symbology comprising a first angular attitude scale comprising a first symbol called an aircraft mockup represented in conformal position, a second vertical speed scale, a third vertical altitude scale, a second symbol called the speed vector represented in conformal position, wherein:

when the angular lateral distance between the position of the first symbol and the position of the second symbol is such that the second symbol is overlaid neither on the second scale nor on the third scale, the first scale is centred on the viewing screen, the second scale and the third scale being disposed on either side of the first scale in a symmetric manner, the second scale having a first determined height and the third scale having a second determined height;

when the angular lateral distance between the position of the first symbol and the position of the second symbol is such that the second symbol is overlaid either on the second scale or on the third scale, the value of the first height of the second scale decreases or the value of the second height of the third scale decreases or the lateral position of the first scale is shifted in such a way that the second symbol called the speed vector is represented in conformal position without overlay.

2. The method of graphical management of the symbology according to claim 1, wherein, when the first height of the second scale or the second height of the third scale have been decreased, the second scale or the third scale are displaced vertically so as not to interfere with the second symbol.

3. The method of graphical management of the symbology according to claim 1, wherein, when the angular longitudinal distance between the position of the first symbol and the position of the second symbol is greater than a predetermined angular value, the three scales are shifted longitudinally by the same value.

4. The method of graphical management of the symbology according to claim 1, wherein, when the angular lateral distance between the position of the first symbol and the position of the second symbol is such that the second symbol is overlaid neither on the second scale nor on the third scale, the distances separating the second scale and the third scale from the first scale are reduced as a function of the three-dimensional synthetic representation of the exterior landscape, the second symbol called the speed vector being represented in conformal position without overlay.

5. The method of graphical management of the symbology according to claim 1, wherein the modifications of height or of location of the first scale, of the second scale or of the third scale are performed automatically by the graphical calculator as a function of predetermined settings.

6. The method of graphical management of the symbology according to claim 5, wherein the shifting of the lateral position of the first scale begins only when the angular lateral distance between the position of the first symbol and the position of the second symbol is greater than or equal to 7 degrees.

7. The method of graphical management of the symbology according to claim 6, wherein the shifting of the lateral position of the first scale is interrupted when the angular lateral distance between the position of the first scale and the position of the second or of the third scale is equal to 1 degree.

8. The method of graphical management of the symbology according to claim 6, wherein the fluctuations of the angular lateral distance between the position of the first symbol and the position of the second symbol are taken into account in real time by the graphical calculator after having applied a temporal filtering.

9. The method of graphical management of the symbology according to claim 6, wherein when the first scale has undergone a displacement equal to an authorized maximum displacement, the speed vector occupying a so-called maximum position, the first scale begins to return towards the centre and the heights of the second scale and of the third scale change only if the speed vector moves by more than one degree with respect to this so-called maximum position.

10. The method of graphical management of the symbology according to claim 1, wherein the modifications of height or of location of the first scale, of the second scale or of the third scale are performed manually by means of a man-machine interface of the viewing system.

11. The method of graphical management of the symbology according to claim 1, wherein, when the attitude of the aircraft in terms of roll or pitch becomes greater than a determined value, the first scale is centred on the viewing screen, the second scale and the third scale are disposed on either side of the first scale in a symmetric manner, the second scale having a first determined height and the third scale having a second determined height.

* * * * *